United States Patent [19]

Tupper

[11] 4,027,778

[45] June 7, 1977

[54] CONTAINER FOR FOODSTUFFS OR THE LIKE

[75] Inventor: Earl Silas Tupper, Panama City, Panama

[73] Assignee: Tup! (Panama) S.A., Panama City, Panama

[22] Filed: Dec. 15, 1975

[21] Appl. No.: 641,112

[30] Foreign Application Priority Data

Dec. 19, 1974 United Kingdom ............ 54988/74

[52] U.S. Cl. ............................... 220/354; 220/355; 220/356; D7/16
[51] Int. Cl.[2] .................. B65D 43/06; B65D 43/08
[58] Field of Search ................. 220/354, 355, 356; D7/16, 17, 76, 83, 84

[56] References Cited

UNITED STATES PATENTS

| 1,454,958 | 5/1923 | Davies | 220/354 |
| 3,511,288 | 5/1970 | Swett et al. | 220/355 X |
| 3,709,397 | 1/1973 | Daenan | 220/354 |
| D238,236 | 12/1975 | Montesi | D7/17 |

*Primary Examiner*—William Price
*Assistant Examiner*—Steven M. Pollard
*Attorney, Agent, or Firm*—Pollock, Vande Sande & Priddy

[57] ABSTRACT

A container has an integral wall defining a moat or channel around its top edge and a lid that seals both with the rim of the container and the upper edge of the moat. The seal can be a plug-type seal, a telescope-type seal or a rim-seal where the rim of the container and/or the upper edge of the moat are held between integral upstanding walls on the rim. Combinations of two different types of seal may be used.

9 Claims, 12 Drawing Figures

CONTAINER FOR FOODSTUFFS OR THE LIKE

The present invention relates to container vessels for materials which need to be sealed from the atmosphere and in particular for food and drink.

It is well known to provide container vessels made of synthetic plastic materials for storing foodstuff and drink. In particular, it is well known to make vessels with a lid which seals around the upper edge of the container. Such a seal can be a "telescope" seal in which a rim of a lid fits inside or outside an upstanding rim of the container, or a "plug" seal in which a depressed portion in a lid fits inside the mouth of the container.

However, it has been found most successful when providing foodstuff containers to provide an annular rim seal, in which an upstanding rim of a vessel is held within a similarly-shaped recess defined between upstanding walls, usually with an integral bridge portion at the top. Such a seal is flexible along various axes and so can be held and fitted securely in place over the rim, but is capable of easy removal as necessary. Earlier proposals include the use of containers with such lids, the containers being provided if apposite in sets which can be stacked one upon another (since the annular rim seal, on the top of the lid, provides a convenient locating space for the bottom of a subsequent container) or sets of containers which can be stacked one within another for transport or sale.

Our British Pat. No. 1,403,193 relates to such containers but includes the improvement in which a moat or channel is formed around an upstanding wall of the vessel. Such a moat or channel has the primary function of preventing crawling insects from reaching the interior of the container and this primary function can be greatly assisted by impregnating or smearing the inside of the moat with insect-repellent material. A second function of this moat or channel is to provide a rigidifying integral surround so that the rim of the container will be held relatively rigidly to fit within its corresponding annular seal on the lid. A third function is to provide a shape which can be applied to a wide range of vessels and containers as a unifying stylistic feature. Other constructional features and advantages of this invention are described in the aforementioned patent. The present invention is a further development of the above idea, and of one aspect consists in a container for food or drink having a peripheral wall and an outwardly and upwardly extending member extending from the wall to define an internal or external moat or channel therewith, in combination with a lid having structure defining a seal both (a) a rim of the container around the top of the peripheral wall and (b) an upper edge of the upwardly extending member defining the moat or channel.

One preferred embodiment of the invention provides a container in which the said rim and the said upper edge of the moat lie at or about the same height. While it is preferable for the container rim and the moat upper edge to terminate at the same height, it is perfectly feasible to arrange them to lie at different heights.

It is possible for the structure defining a seal to include a plug type seal in which a downwardly depressed portion of the lid plugs into the opening of the container, i.e., fits within the said rim. Alternatively, a suitable downwardly depressed annular portion of the lid can fit as an annular plug into the moat, sealing both sides of the moat against ingress or egress of air.

It is also possible for the structure defining a seal to include a telescope type seal wherein a downwardly extending wall portion on the lid fits over or within said container rim. Alternatively, such a telescope type seal can be provided over or within said upper edge.

It is, however much preferred if the structure defining a seal includes a so-called rim seal, i.e., a seal where two seal wall (for instance either parallel or converging) fit sealingly over the said container rim or over the said upper edge.

There are of course two seals necessary for each container, one with the rim and one with the said upper moat edge. Various combinations of seals can be envisaged for this purpose, but we have found it advantageous to combine (i) the combination of a telescope type seal at the moat (preferably lying outside the upper edge) with either a plug seal, telescope seal or rim seal at the container rim and (ii) the combination of a rim seal at the moat upper edge with those three types of seal.

The most preferable combination includes two rim seals, one for the container rim and one for the moat upper edge.

A further feature of the present invention is to provide such a container whereof the lid has a pattern of radially extending ridges and grooves. This can conveniently be formed as a "sunburst," i.e., a configuration in which the central portion of the lid is ungrooved. It has been found that such a grooved lid is stronger than a corresponding but ungrooved lid. Since the double-seal container according to the present invention is frequently to be used for storage of foodstuffs, and is therefore relatively large, it is clearly advantageous to have a strong lid both for appearance and for stacking other vessels upon it. Moreover, it has been found that to provide the lid with radial grooves assures that the lid will flex in any direction across the middle, since the radial grooves provide suitable lines of flexure. This is of advantage in the present invention, since the lid must be sufficiently flexible to ensure good seating not of one surrounding seal but of two.

While the present invention provides the container itself provided with a suitable moat structure, where the edge of the moat is so shaped and located that it can be utilized as a sealing edge in addition to the sealing edge provided by the rim of the container, the invention primarily extends to the combination of the container and the suitable sealing lid having a double seal arrangement as described above.

The invention will be further described with reference to the accompanying drawings, in which.

Figure 1:
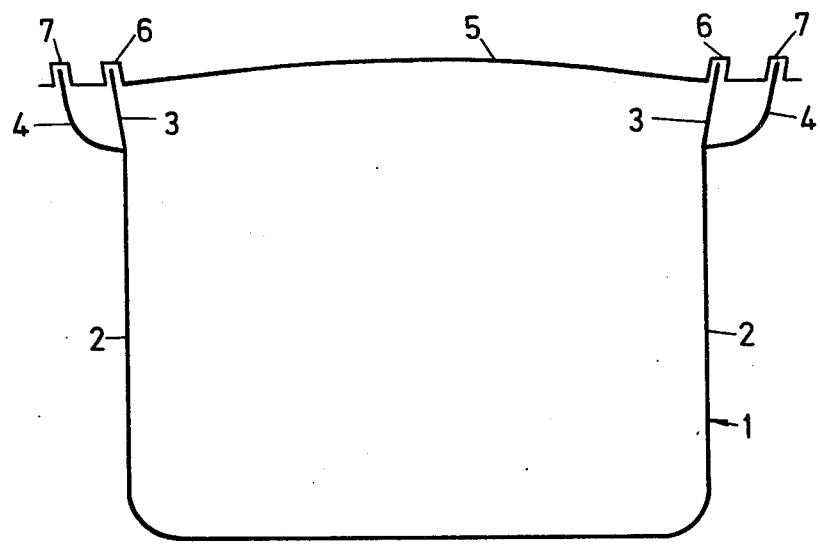
FIG. 1 shows a diagrammatic section of one embodiment of the container and its lid.

In FIG. 1 a container 1 has an upstanding peripheral wall 2 terminating in an integral rim 3, in this instance an outwardly tapered rim. Around the peripheral wall and the rim 3 is an integral channel or moat 4. This moat may be, for example, as described in our British Pat. No. 1,403,193. In the embodiment as shown in FIG. 1 the upper edge of the rim 3, and the upper edge of the moat 4 lie approximately in the same plane. The container 1 and the surrounding moat 4 are both sealed by a lid 5 having an inner rim seal 6 and an outer rim seal 7, sealing the rim 3 and upper edge of moat 4, respectively. As shown in the drawings, both of these seals in cross-section exhibit upstanding walls and an integral top portion so as to receive sealingly an upstanding rim. Such seals have been known for many years in the fabrication of plastic containers.

Because the interior of the container 1 is sealed from the insect-repelling both by the seal 6 extending around the rim 3 of the container itself and by the seal 7 extending around the upper edge of the moat an improved seal is obtained. Moreover, as explained in our aforementioned patent, the moat provides a barrier to insects crawling up the outside of the container over the top and into the container. The moat if necessary may be filled with or impregnated with or smeared with an insect-repelling material. Moreover, the moat itself may be attractively shaped so that it can be applied to a whole line of vessels as a unifying feature of style. In any case it will preferably be of such dimensions that it can be readily cleaned and/or so that the insectrepelling material can readily be applied. Further discussion of the preferred dimensions and shape of such a moat or channel is given in our British Pat. Specification No. 1,403,193.

Figure 2:
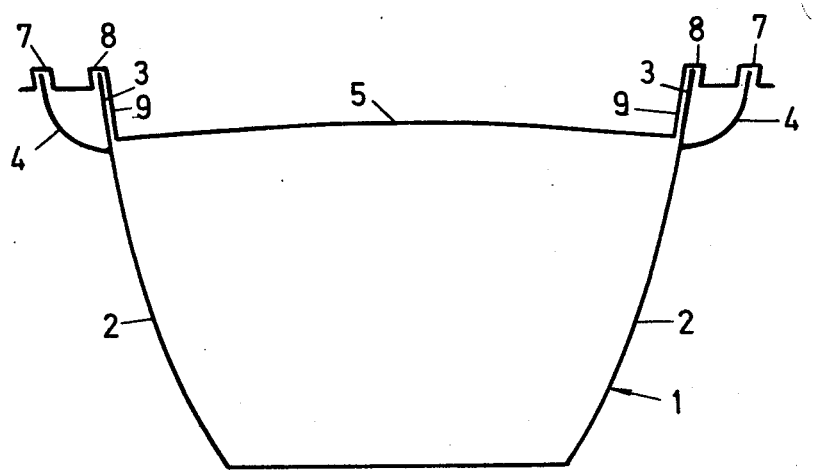
FIG. 2 shows a similar diagrammatic section of another embodiment of container and lid.

FIG. 2 shows a generally similar container but in which the inner rim seal, in this case referenced as 8, is provided with a deep inner wall 9 defining a depressed portion of the lid as a plug type seal. This allows for positive location of the lid within the container while fixing, while still providing for a sealed portion around the rim 3 of the container. Moreover, the outer rim seal 7 around the upper edge of the moat provides improved sealing of the interior of the container against atmosphere. The deepened portion of the lid as provided by the lengthened wall 9, is helpful when stacking of a further container upon the lid or in the provision of a strengthening pattern on the lid itself. This will be discussed more fully below.

Figure 3:
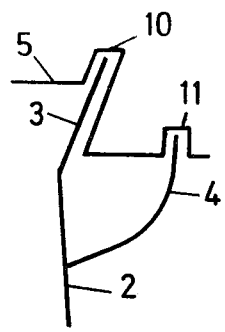
FIG. 3 shows a diagrammatic partial section of the sealing of an alternative embodiment of lid to a container.

While both of the above embodiments show a moat or channel 4 and a rim 3 of the container 3 with their upper edges lying at more or less the same height, it is possible within the scope of the present invention for the container rim 3 and for the moat 4 upper edge to reach to different heights if a suitably shaped lid is provided. An example of this is shown in FIG. 3 (where only a part-section through the container and its lid is shown, for convenience). In this instance a rim seal 10 is provided around the top of the container rim 3, and a rim seal 11 is provided around the upper edge of the moat or channel 4.

Figure 4:
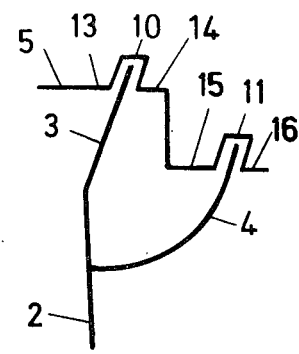
FIG. 4 shows an alternative embodiment in a partial section similar to that of FIG. 3.

It will be apparent that in FIG. 3 a relatively long wall 12 is provided on the outer edge of the rim seal 10. In FIG. 4 the need for such a wall is obviated, thereby increasing the flexibility and ease of fabrication of each rim seal 10 and 11. Each of the seals 10 and 11 as shown in FIG. 4 is provided with flat peripheral surrounding regions such as shown at 13, 14, 15 and 16.

In each of the above embodiments, the various seals have been shown as annular rim seals or in the case of Flg. 2, as a plug type variant of such a rim seal. However, it is possible for the seals to be other than annular rim seals.

Figure 5:
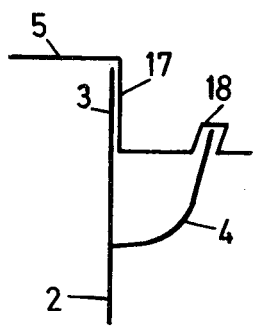
FIG. 5 shows an alternative embodiment in partial section similar to that of FIG. 3.

For instance, in FIG. 5 a structure is shown in which the lid is provided with a telescope type seal 17, in which the sealing is obtained merely by the pressing of one substantially vertical (as shown) or slightly tapering surface over another, and an outer annular rim seal 18, of the type described above.

Figure 6:
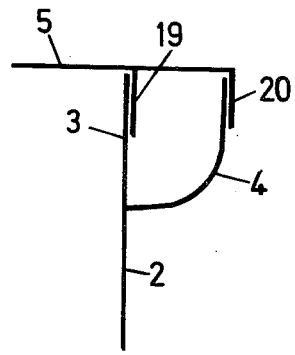
FIG. 6 shows an alternative embodiment employing a different type of seal but otherwise in a partial section similar to that of FIG. 3.

In FIG. 6 an embodiment is shown in which the rim 3 and the moat 4 terminate at approximately the same height. In this instance two telescope seals 19 and 20 (constituting an inner and an outer seal respectively) are shown. While a telescope seal is generally speaking not as effective as an annular rim seal, the provision of two telescope seals will be found for many purposes to be an improvement on the use of one telescope seal, and adequate for most kitchen uses.

Figure 7:
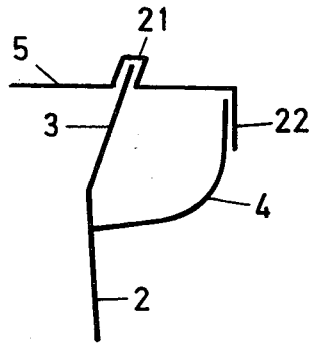
FIG. 7 shows an alternative embodiment in a partial section similar to that of FIG. 3, with a different combination of seals.

FIG. 7 shows further embodiment in which the upper edge of moat 4 lies at a level slightly below the rim 3, thus lending itself to the provision of an inner annular rim seal 21 and an outer telescope seal 22.

Figure 8:
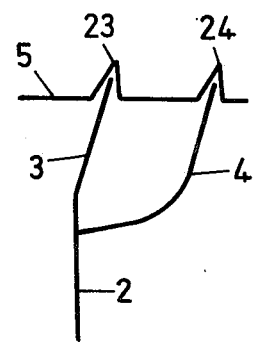
FIG. 8 shows an embodiment in a section similar to that of FIG. 1 with a different type of lid.

It is also possible for the present invention to be embodied using newer types of seal derived from the annular rim seal as discussed above. For instance, a rim seal as described in our aforementioned patent, generally resembling the prior art rim seal but having two converging walls rather than parallel walls connected at the top, may be used. This is shown in FIG. 8 in which an inner seal 23 and an outer seal 24, both of this generally "inverted-V" shape configuration in cross-section, are shown upon a container in which the rim 3 of the container and the upper edge of the moat 4 terminate at about the same height. As discussed in our British patent, such a seal has two axes of flexure as against three for the prior art annular rim seal, and thus lends itself more readily to use in this embodiment in which two sealing rims are to be utilized and manipulated into two corresponding seals on a single lid.

The present invention can also be embodied using a "plug" type seal.

Figure 9:
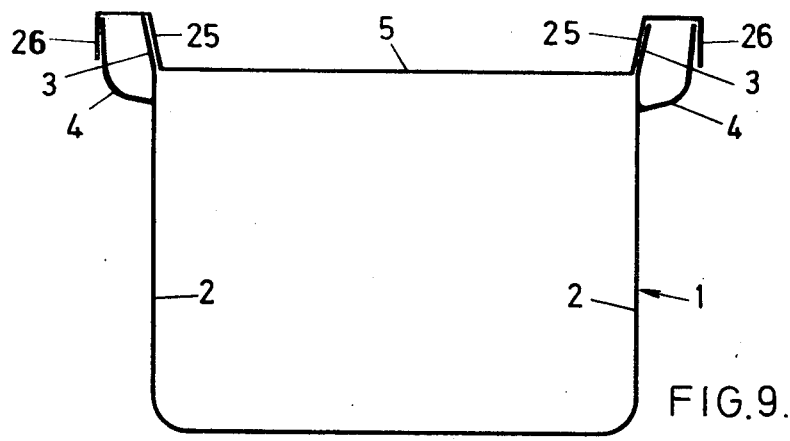
FIG. 9 shows an embodiment in which the moat lies within the outer wall of the container, and both are equipped with a lid as shown in FIG. 1.

One embodiment of this is shown in FIG. 9, in which a plug seal provided in a container by virtue of downwardly extending wall 25 which pushes the rim 3 of container 1 outwards. The structure as shown in FIG. 9 is completed by a telescope seal provided by downwardly extending wall 26 which fits around the outside of the moat 4. In effect therefore a lid as shown in FIG. 9 deforms the two sides of the moat 4 towards one another and thus provides a seal by the flexure across the width of the moat.

Figure 10:
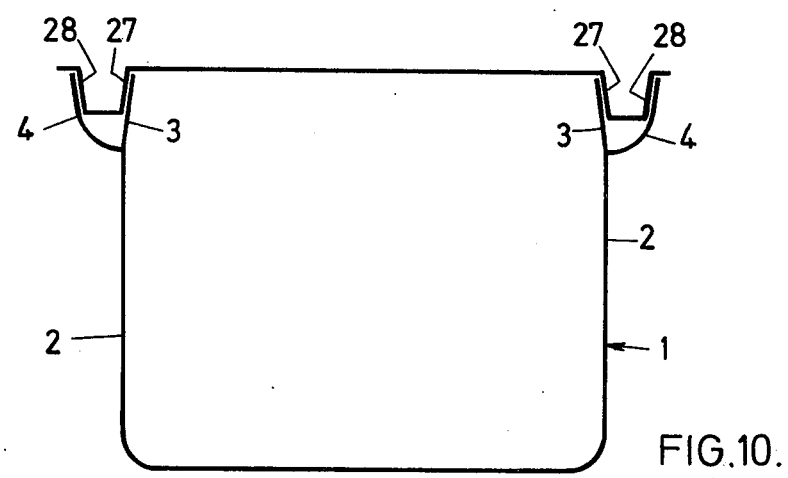
FIG. 10 shows an embodiment in section similar to that shown in FIG. 1 but in which the lid has a different type of seal.

FIG. 10 shows a different type of plug seal, in which an annular plug within the moat is provided. The lid has two downardly extending walls 27 and 28, to define an annular plug which forces apart the walls 3 and 4 of the moat to provide a seal.

It will be apparent that the seals as shown in the above embodiments can be combined in other ways provided that the central concept of the invention is adhered to.

Figure 11:
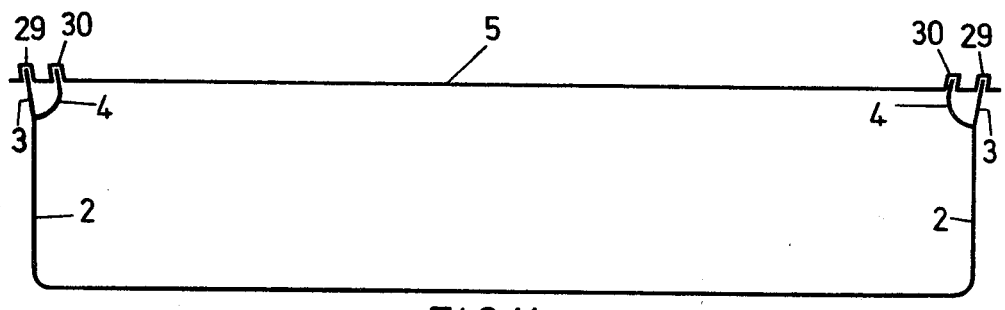
FIG. 11 shows an embodiment in section similar to that shown in FIG. 1 but in which the lid has a yet further type of seal.

Moreover, while all of the above embodiments are concerned with the provision of a moat surrounding the container on the outside, it is possible (especially with larger sizes of containers) to provide an internal moat and to equip the container with a lid as shown above. An example of this is shown in FIG. 11, where the seals are shown at 29 and 30 but are otherwise the same as shown in FIG. 1. In this instance the moat 4 extends around within the upstanding peripheral wall 2 so that the external appearance of the container gives no indication that the moat is present.

Figure 12:
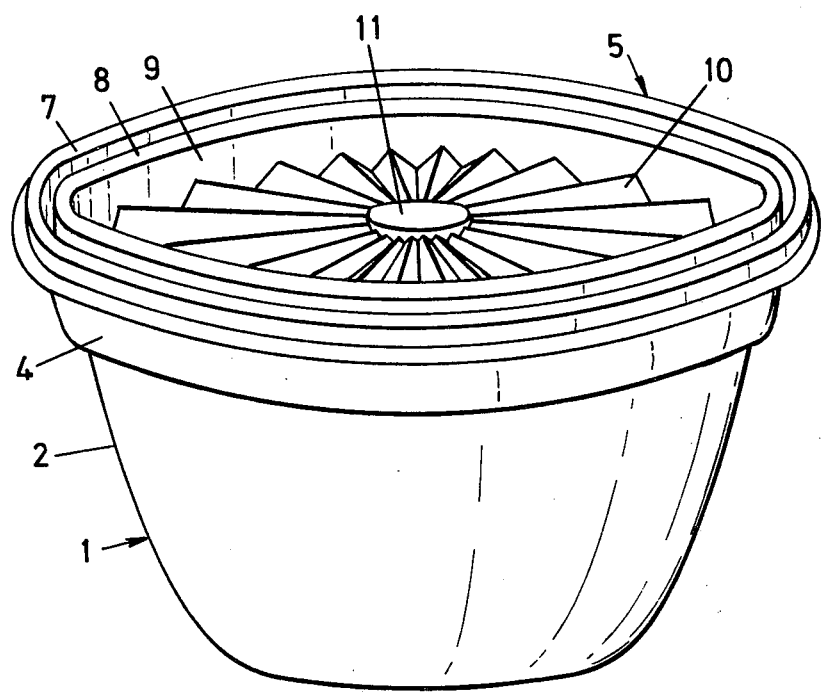
FIG. 12 shows an embodiment as shown in FIG. 2 but in a general perspective view and indicating a sunburst pattern of radial ribs on the lid.

FIG. 12 shows a perspective view of a container and lid according to the invention, and as generally illustrated in diagrammatic section by FIG. 2 above. The container 1 has an upstanding wall 2 from which protrudes a moat 4. The rim 8 of the container and the upper edge of the moat terminate at approximately the same height within the peripheral rim seals 7 and 8 of the lid, generally indicated at 5. The inner edge of seal 8 is defined by a relatively deep wall 9, surrounding a sunburst pattern 10 of radial ribs terminating in a central boss 11.

It is advantageous to use such a radial pattern in the containers and lids according to the present invention. Since it is necessary when assembling the container and the lid as shown in any embodiment above to manipulate two seals over, or otherwise in relation to, two upstanding rims, a reasonable degree of flexibility must be provided all around the lid. This can be done by having a flat surface, but such a flat surface is not always attractive and cannot always be used as a support surface for containers stacked on top of the lid. Accordingly, some form of strengthening ridges or corrugations are of value, especially upon such a lid of wide expanse. A radial pattern provides axes of flexure, running through the centre of the container, in relation to wherever the doubly-sealed lid is pressed up from the container to remove it, or down onto the container to fix it. This effect is particularly marked with round containers but is also apparent with containers of other shapes, especially containers with somewhat rounded sides. It appears that the radial corrugations define lines along which such flexure can take place, and that the resulting flexibility is of particular advantage in assembling a double-seal lid as shown.

I claim:

1. The combination of (A) a container for food or drink, said container comprising a base and an integral peripheral wall, said wall having a free upstanding rim around the top and a member conncted to said wall below said rim and extending away from the wall and thence upwardly, terminating in a free upstanding upper edge, to define a moat therewith, and (B) a lid having structure defining a seal both (a) with the said rim of the container around the top of the peripheral wall and (b) with the said upper edge of the upwardly extending member defining the moat or channel.

2. The combination as claimed in claim 1, wherein the said rim and the said upper edge lie at the same height above said base.

3. The combination as claimed in claim 1 in which the said rim and the said upper edge lie at different heights above said base.

4. The combination as claimed in claim 1 wherein said lid comprises a downwardly depressed central portion which fits within said rim to provide a plug-type seal and wherein said lid further comprises a rim-seal wherein two seal walls fit sealingly over said moat upper edge.

5. The combination as claimed in claim 1 wherein said lid comprises a downwardly extending wall portion to fit as a telescope-type seal in relation to said rim and wherein said lid further comprises a rim-seal wherein two seal walls fit sealingly over said moat upper edge.

6. The combination as claimed in claim 1 wherein said lid comprises a downwardly extending wall portion to fit as a telescope-type seal in relation to said moat upper edge and wherein said lid further comprises a rim-seal wherein two seal walls fit sealingly over said container rim.

7. The combination as claimed in claim 1 wherein said lid comprises a rim-seal wherein two seal walls fit sealingly over said container rim and wherein said lid further comprises a rim-seal wherein two seal walls fit sealingly over said moat upper edge.

8. The combination as claimed in claim 1 wherein the container has a pattern of radially extending ribs and grooves on the lid.

9. The combination as claimed in claim 8 wherein the pattern has an ungrooved central portion.

* * * * *